June 12, 1962
C. B. RICHEY ETAL
3,038,544
TRACTOR STEERING MEANS
Filed Nov. 3, 1958
5 Sheets-Sheet 2
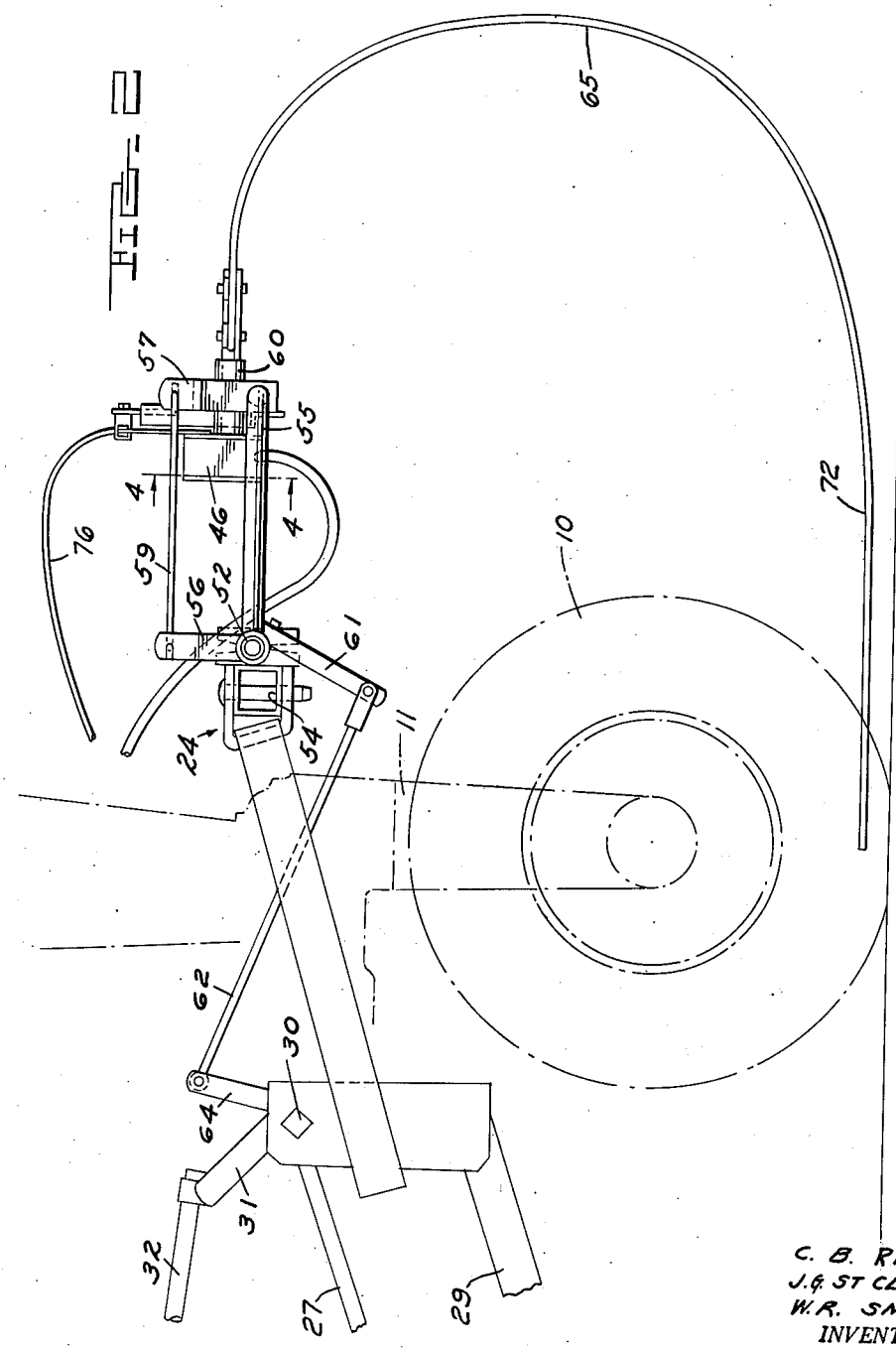
C. B. RICHEY
J. G. ST CLAIR
W. R. SMITH
INVENTORS
BY E. C. McRAE
J. R. FAULKNER
P. F. HILDER
ATTORNEYS

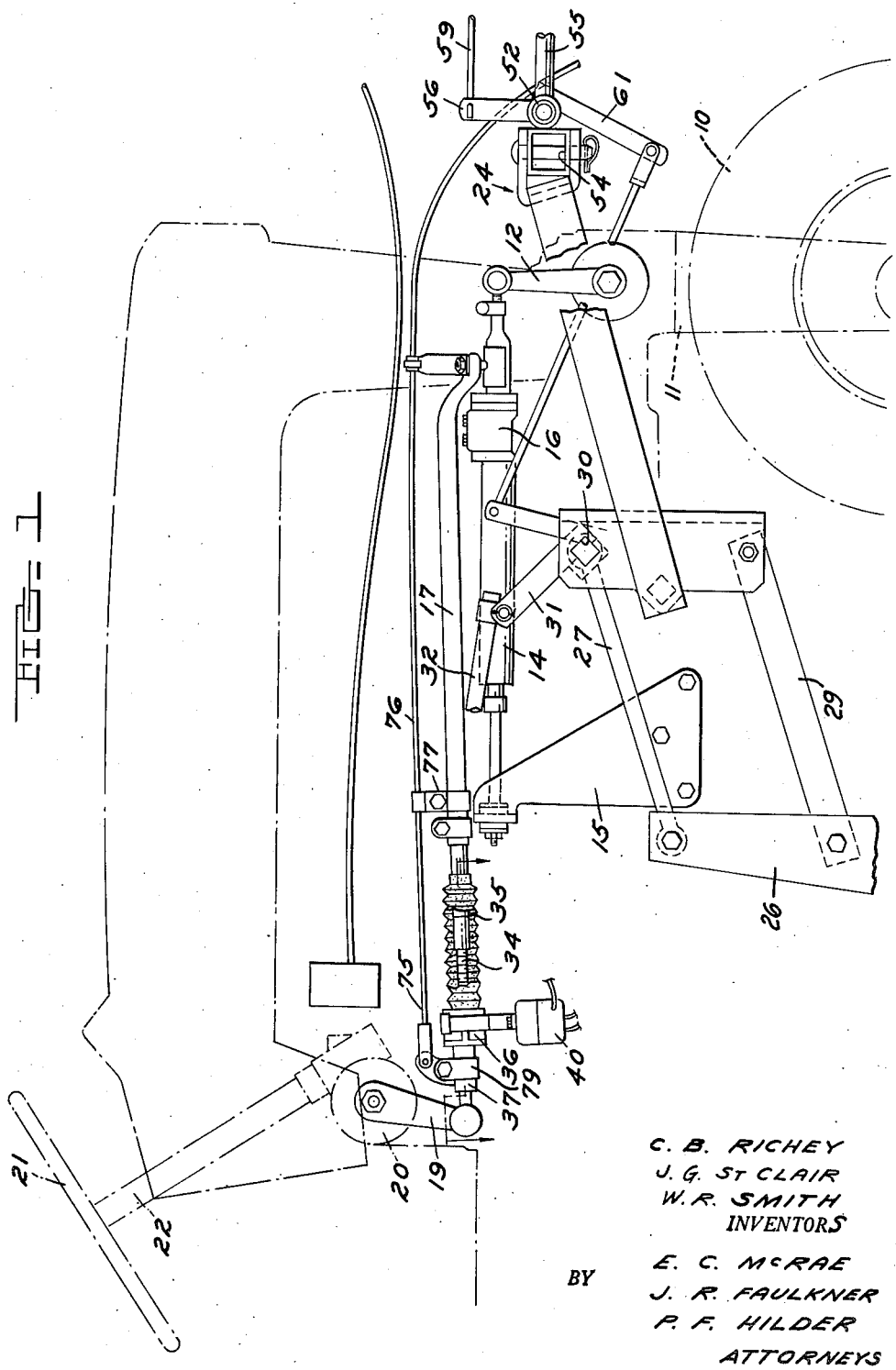

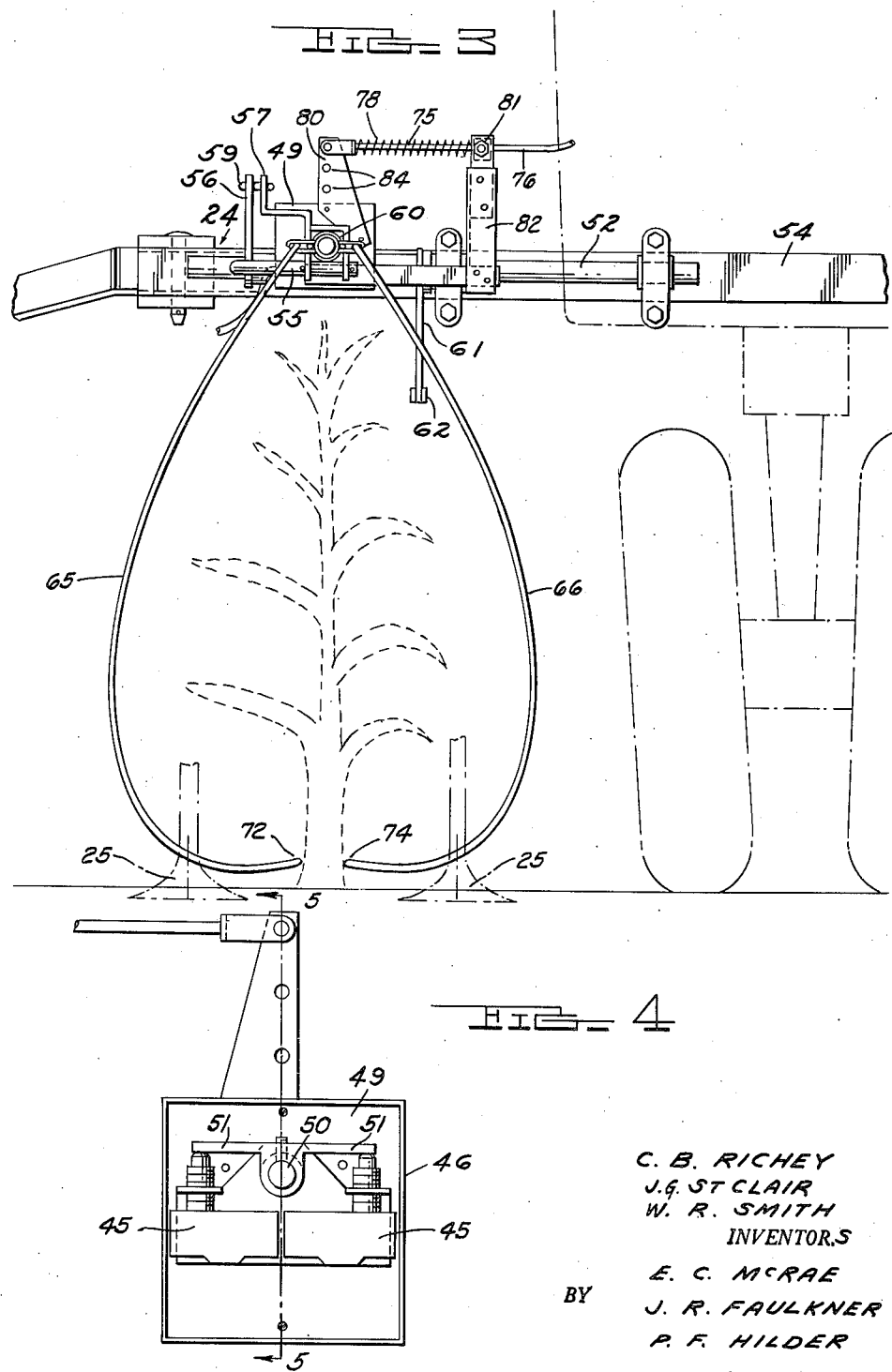

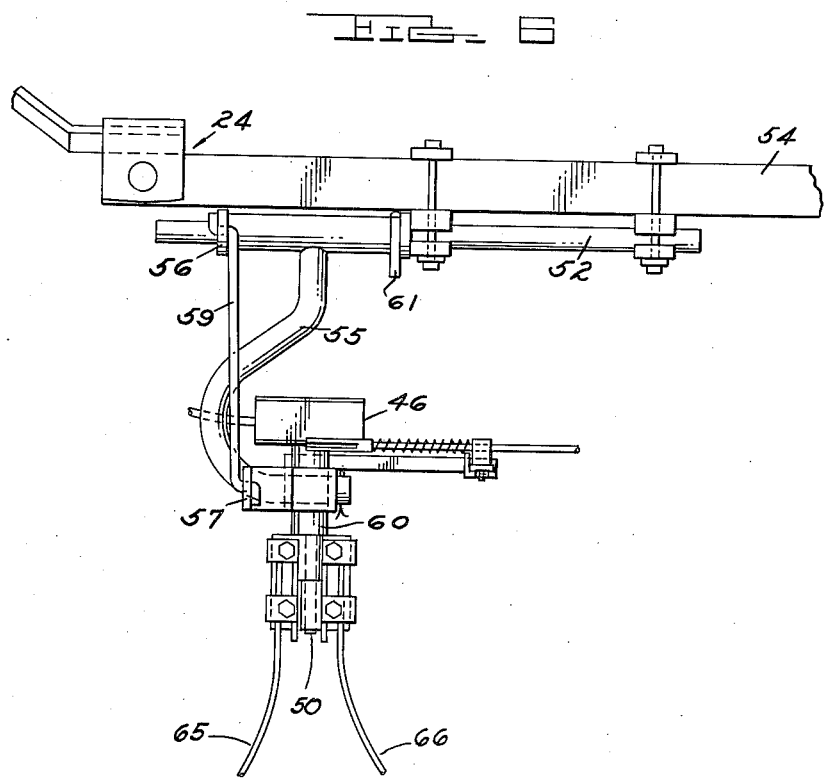
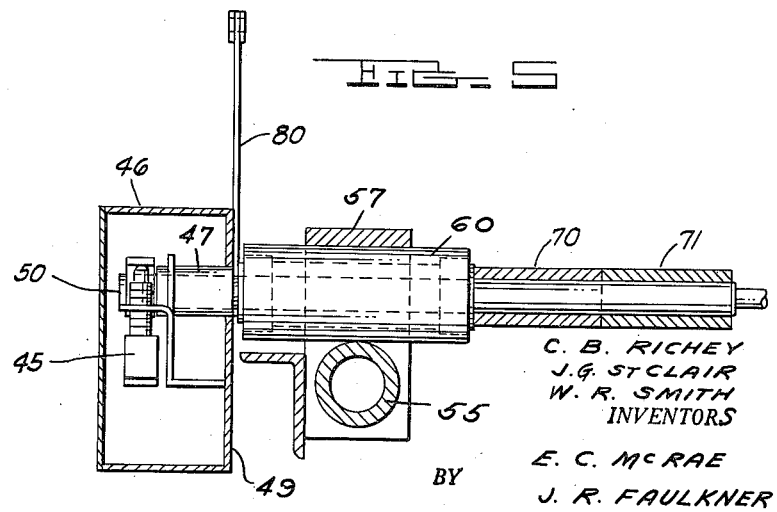

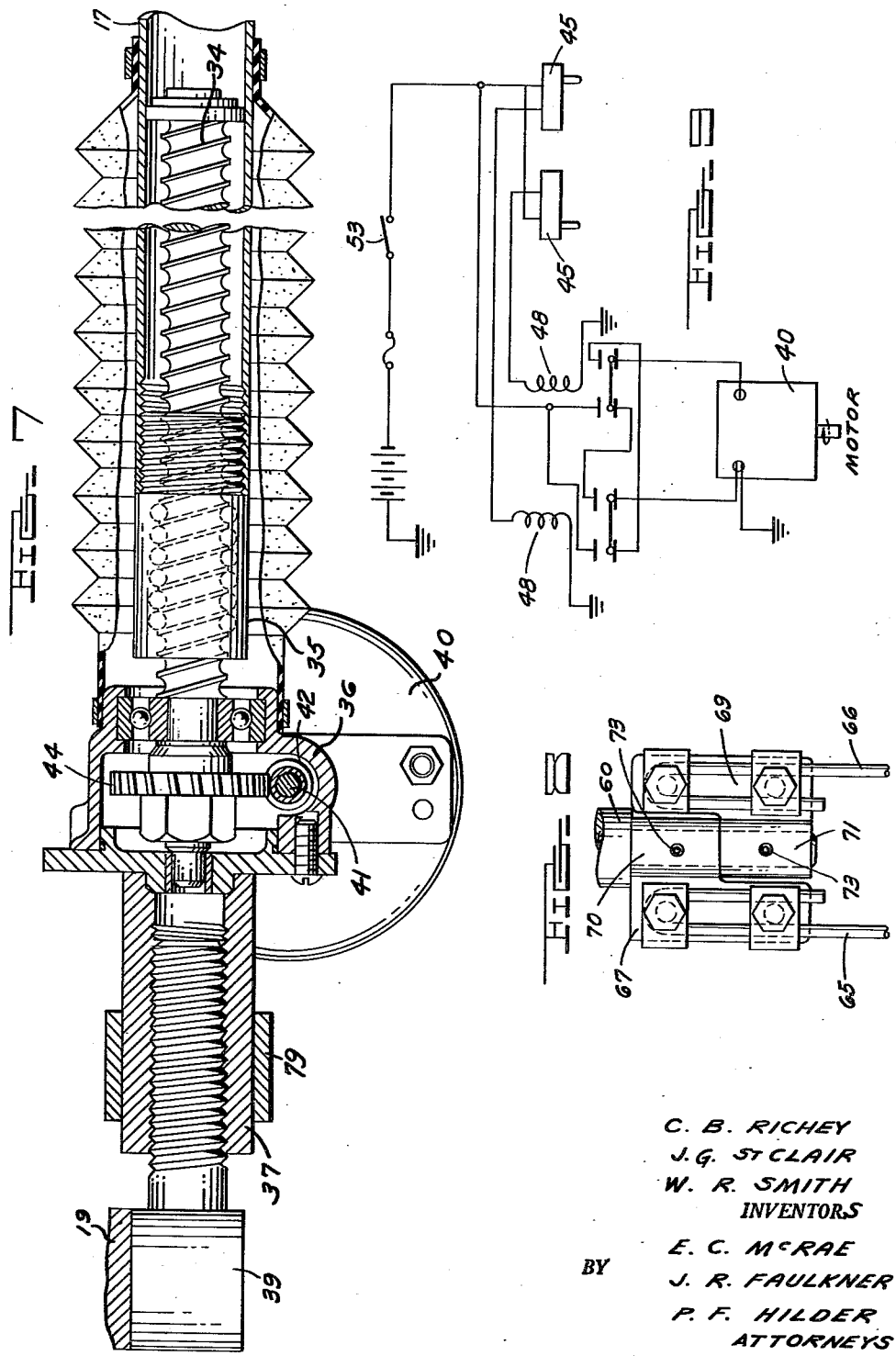

United States Patent Office 3,038,544
Patented June 12, 1962

3,038,544
TRACTOR STEERING MEANS
Clarence B. Richey and James G. St. Clair, Royal Oak, and William Robert Smith, Birmingham, Mich., assignors to Ford Motor Company, Dearborn, Mich., a corporation of Delaware
Filed Nov. 3, 1958, Ser. No. 771,409
14 Claims. (Cl. 172—5)

This invention relates to an automatic steering system for motor vehicles.

In certain farming operations, including the cultivating of row crops, the harvesting of crops and the plowing of land, it is essential or desirable to accurately steer the tractor to which the cultivating implement, harvesting implement or plow is attached. Accurate steering of the tractor, particularly when cultivating, requires the full-time attention of the operator in order to avoid running off to one side or the other and damaging the crop being cultivated. Moreover, this concentration over a long period of time is very tiring; and after several hours of driving, the operator becomes fatigued. As a consequence, the tractor steering is apt not to be so precise, with attendant damage to the crop.

According to the embodiment shown of the present invention, the tractor is provided with an automatic steering system controlled by a pair of feelers which are mounted on a longitudinal shaft and ride one on each side of the crop row. When the tractor is positioned with the feelers centered on the crop row, the longitudinal shaft is in neutral position; but upon the tractor moving to one side or the other, the feelers are laterally displaced so as to rotate the shaft slightly from its neutral position and actuate one or the other of a pair of miniature low effort switches of the "Microswitch" type to operate an electric motor for correcting the steering of the tractor to follow the physical line established in this instance by the crop row.

The electric motor for correcting tractor steering is of the reversible type, being operated selectively in one direction or the other by the miniature switches associated with the feeler mechanism. Rotation of the motor rotates a screw associated with the drag link for lengthening or shortening its effective length to control the operation of the power cylinder and steer the tractor. At the same time, operation of the screw rotates the miniature switches about the axis of the feeler mechanism to prevent overcorrection and hunting of the steering mechanism in bringing the tractor back on course. Inasmuch as the automatic steering is interposed in the drag link connecting a more or less conventional steering gear with the control valve of the power steering cylinder, the automatic steering mechanism is subject to overriding at any time by the operator merely by turning the steering wheel in the normal manner.

Among the objects of the present invention are to provide an automatic steering system for vehicles which is simple, dependable, and cheap to manufacture; which utilizes relatively few parts; which eliminates oversteering and hunting of the mechanism; which is subject to overriding by the operator at any time merely by steering in the normal manner; and generally to improve automatic steering systems for vehicles.

Other objects, and objects relating to details and economies of manufacture and use will be more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification in which:

FIGURE 1 is a somewhat diagrammatic side elevation of the automatic steering device applied to a tricycle tractor upon which a cultivator is mounted, the tractor and cultivator being generally indicated and the feeler and miniature switch assembly at the front of the tractor being omitted for convenience of illustration;

FIGURE 2 is a forward extension of FIGURE 1, showing the front end of the tractor and the miniature switch and feeler assembly of the automatic steering system;

FIGURE 3 is a front elevation of the forward portion of the automatic steering mechanism including the feeler and miniature switch assembly, the tractor and portions of the cultivator being generally indicated;

FIGURE 4 is a rear elevation showing the miniature switches and the shaft supporting the feelers and also showing a portion of the mechanism to prevent oversteering;

FIGURE 5 is a vertical section of the miniature switch and feeler shaft assembly taken generally along the line 5—5 of FIGURE 4;

FIGURE 6 is a top plan view of the mechanism for lifting and lowering the feelers between operating and non-operating position in response to lifting and lowering of the cultivator;

FIGURE 7 is an enlarged longitudinal horizontal cross section of the rear portion of the drag link;

FIGURE 8 is a top plan view showing the connection of the feelers to the feeler shaft; and FIGURE 9 is a wiring diagram of the motor controls.

Referring now to the drawings, the present invention, as shown, is applied to a Ford tricycle tractor in which a pair of closely-spaced front wheels 10—10 are mounted on a spindle assembly 11 which is rotated on a vertical axis by a steering arm 12 projecting upwardly at one side of the tractor. The steering arm 12 is rotated a limited amount in either direction for steering by a power steering cylinder 14 extending between the free end of the steering arm 12 and an abutment 15 fixed to the tractor frame. The cylinder 14 includes a valve body 16 for controlling the flow of hydraulic fluid to and from the cylinder in accordance with the movement forward or back of the drag link 17. The cylinder 14 is so designed that movement of the forward end of drag link 17 forward and backward a slight amount will actuate a hydraulic valve member (not shown) within the cylinder in a well-known manner to cause the cylinder to follow the movement of the drag link, the cylinder 14 supplying nearly all of the effort for steering the tractor. The drag link may be moved forwardly or rearwardly by a steering gear pitman arm 19 projecting from a steering gear 20, the arm being rotated a limited amount in either direction by the tractor operator by turning a more or less conventional steering wheel 21 and steering shaft 22. The above arrangement is more or less conventional, the general steering linkage being shown in Strehlow United States Patent No. 2,301,152 and a power steering cylinder generally similar to the cylinder 14 being shown in MacDuff United States Patent No. 2,757,748.

The automatic steering mechanism of the present invention is particularly suited for steering a tractor during the cultivation of row crops such as corn; and in the drawings, portions of a front-mounted cultivator have been shown. The cultivator includes a frame 24 fixed to the tractor so as to project from each side thereof. The cultivator consists of a number of sweeps or shovels 25 which are supported from a framework 26 mounted for raising and lowering movement on the frame 24 by means of a parallelogram-type linkage including links 27 and 29. The sweeps or shovels 25 are raised or lowered by limited rotation of a square shaft 30 journaled in the frame 24 and to which the link 27 is fixed. The shaft 30 is rotated by means of a lever 31 fixed to the shaft actuated in a customary manner by a link 32, which is actuated by a linkage at the rear of the tractor (not shown), including the tractor lift arms. The cultivator construction is generally conventional.

According to the present invention, the effective length of the drag link 17 is changed automatically by associating with the drag link a longitudinally-extending screw 34 having a number of threads and being capable of being telescoped into and out of an internally-threaded section 35, the screw being rotated for steering by a reversible electric motor 40. Preferably, the screw 34 is incorporated as an actual part of the drag link 17, one end of the screw being rotatably mounted within a body 36 forming a portion of the drag link, the body 36 having a projecting internally-threaded sleeve 37 for threadedly receiving a ball joint assembly 39 adapted to be secured to the free end of the pitman arm 19.

The reversible electric motor 40 is mounted on the body 36 and is provided with a motor shaft 41 having a worm gear 42 fixed thereto and meshing with a co-operating pinion 44 fixed to the rear end of the screw 34. Rotation of the motor shaft 41 in one direction will serve to turn the screw 34 in a direction to lengthen the drag link 17, while rotation of the motor shaft in the other direction will shorten the drag link 17.

Operation of the motor 40 is controlled by a pair of single-pole, single-throw miniature switches 45, of the plunger-operated "Microswitch" type which are spring-biased towards open position. The switches 45 are fixedly mounted within a box 46 which is mounted at the front of the tractor on a linkage to be described. The box has a sleeve 47 projecting through the forward wall 49 of the box. A shaft 50 is rotatably received within the sleeve 47, and the rear end of the shaft is provided with projecting levers 51—51 which rotate with the shaft and operate the switches 45. The arrangement is such that in neutral position of the shaft, neither switch 45 is actuated to closed position; but upon the slight rotation of the shaft 50 in either direction, the corresponding switch will be closed to complete the circuit to the motor 40, actuation of one switch 45 operating the motor in one direction and actuation of the other switch 45 operating the motor in the opposite direction.

The miniature switches 45—45 preferably are arranged in circuit indicated in FIGURE 9, in which the miniature switches selectively operate a pair of relays 48—48 which are spring-biased to nonoperative position, but, upon actuation, one relay operates the motor in one direction and the other relay operates the motor in the other direction. If desired, a hand operated single-pole, single-throw switch 53 may be included in the circuit to control operation of the automatic steering system. The use of the relays reduces the amount of current carried through the miniature switches and contributes to a more dependable mechanism.

The box 46 and shaft 50 are supported at the front of the tractor by a linkage which preferably provides for raising and lowering of the box and shaft as the cultivator sweeps or shovels 25 are raised to transport and lowered to operating position. This linkage preferably consists of a shaft 52 extending transversely of the tractor and rotatably mounted on a transverse member 54 comprising a portion of the frame 24 of the cultivator. The box 46 is supported from the shaft 52 by a parallelogram-type linkage including a forwardly-extending arm 55 and an upwardly-extending arm 56, both of which are non-rotatably mounted on the shaft 52. A vertical link 57 and a forwardly-extending link 59 complete the parallelogram, and the sleeve 47 projecting from the box 46 is rotatably received within a sleeve 60 fixed to the link 57, the sleeves and shaft 50 projecting longitudinally of the tractor and preferably being generally horizontal.

The shaft 52 is linked for movement with the cultivator sweeps 25 by a lever 61 fixed to the shaft, a link 62 extending rearwardly from the free end of the lever 61 and a second lever 64 fixed to the square shaft 30 of the cultivator and receiving the rear end of link 62. By means of this linkage, wherein the shaft 50 is rotated to raise the sweeps 25, the switch box 46 and shaft 50 are raised, the shaft 50 remaining generally horizontal.

A pair of curved, stiff-wire feelers 65 and 66 are fixed to the forward end of the shaft 50, being attached to outwardly projecting flanges 67 and 69 of a pair of collars 70 and 71, respectively, secured to the forward end of the shaft 50 by set screws 73. The feelers 65 and 66 are similarly shaped but of opposite hand, projecting forwardly and downwardly in a sweeping curve (see FIGURES 2 and 3) and terminating in horizontally-extending portions 72 and 74, respectively, which are slightly above ground level when the box 46 and shaft 50 are in lowered position. The feelers 65 and 66, when viewed from the front, collectively have a generally pear-shaped outline, the feelers projecting laterally outwardly from each other so as to permit a stalk of corn or other row crop to be cultivated to pass between the feelers and the horizontal portions 72 and 74 of the feelers extending rearwardly in close, side-by-side, parallel relation so as to guide the lower portion of the stalk of the crop. Preferably, the converged horizontal portions 72 and 74 extend somewhat forwardly of the front wheels 10, 10 of the tractor. The spacing between the portions 72 and 74 of the feelers may be adjusted by rotation of the collars 70 and 71 on the shaft 50.

The arrangement of the mechanism is such that when the feelers 65 and 66 are hanging vertically down with the gap between the feelers directly below the shaft 50, the shaft 50 is in neutral position, and neither switch 45 is actuated. This is the position of the mechanim as the tractor is steered on to the end of a crop row with the feelers in lowered position. As soon as the feelers, which are a short distance in front of the front wheels 10—10 of the tractor, enter the crop row, the crop will deflect the feelers either to the left or the right as viewed in FIGURE 3 unless the feelers are centered on the row. Deflection of the feelers 65 and 66 to either side will correspondingly rotate the shaft 50 in the same direction to close one or the other of the miniature switches 45 and actuate the electric motor 40. Actuation of the motor 40 will rotate the screw 34 so as to either lengthen or shorten the drag ling 17, the pitman arm 19 of the steering gear and the steering wheel 21 remaining stationary. Lengthening or shortening of the drag link 17 will move the forward end of the drag link forwardly or backwardly, actuating the valve 16 of the power steering cylinder 14 to steer the tractor back towards a position in which the feelers 65 and 66 are centered on the crop row.

In order to prevent oversteering and hunting due to continuing to turn the wheels in a correcting direction, resulting in the wheels still being turned as the feelers recenter on the crop row and the shaft 50 returns to neutral position, a follow-up mechanism is provided. This mechanism consists of a push-pull cable 75 of the Bowden wire type, the sheath 76 of the cable being fixed to the forward portion of the drag link 17 by a clamp 77 and the rear end of the cable 75 being secured to the sleeve 37 of the drag link by a clamp 79. The arrangement is such that shortening or lengthening of the drag link 17 due to rotation of the screw 34 by the motor 40 correspondingly moves the cable 75 either forwardly or rearwardly, respectively, within its sheath 76.

The forward end of the cable 75 is secured to a lever 80 projecting upwardly from the switch box 46, the sheath 76 of the cable being secured by a clamp 81 mounted on an arm 82 projecting laterally from the sleeve 60 fixed to the link 57. A compression spring 78 extending between the clamp 81 and the end of cable 75 eliminates lost motion in the cable linkage.

The arrangement is such that the cable 75 and the lever 80 hold the switch box 46 against rotation about the axis of the feeler shaft 50. However, upon actuation of either of the switches 45 to operate the motor 40, the rotation of screw 34 to lengthen and shorten the drag link 17 will simultaneously operate the cable 75 to rotate the switch box 46. Such rotation of the switch box 46 correspondingly rotates the switches 45 about the axis of the feeler shaft 50 so as to open the circuit to the electric motor 40 and prevent additional corrective steering of the tractor wheels. Preferably, a series of holes 84 are provided in the lever 80 at varying distances from the shaft 50 to provide for varying the angle through which the switch box 46 is rotated for a fixed lengthening or shortening of the drag link 17. In this manner, the sensitivity of the steering device (the amount of wheel movement for a given increment of feeler displacement) can be adjusted as required for different crops and different speeds of tractor operation. Inasmuch as lengthening and shortening of the effective length of drag link 17 will provide a reaction on the steering gear pitman arm 19 equal to the force applied to the power steering cylinder valve 16, this force will be communicated to the steering wheel 21 of the tractor unless the steering gear 20 is completely irreversible. Inasmuch as most tractor steering gears are not completely irreversible, it is preferable to use a power steering cylinder having a low-effort valve so that no objectionable force will be transmitted to the steering wheel due to operation of the automatic steering device. However, a power steering cylinder requiring greater effort for actuation of the valve may be used together with a steering wheel of the Kosch type which is shown in United States Patent No. 2,819,778 and which prevents the transmittal of forces on the steering gear from passing to the steering wheel.

The above-described mechanism permits the tractor operator, after he has lowered the automatic steering device and cultivator to operating position and centered the feelers 65 and 66 onto the crop row, to relax and to observe the cultivation operation as a whole without having to concentrate on maintaining the tractor centered on the row. The operator may rest his hands on the steering wheel or may place his hands anywhere he chooses. However, should an emergency arise at any time and upon approaching the end of the crop row, the tractor operator may override the automatic steering mechanism at any time without turning off the mechanism and merely by grasping the steering wheel and turning it in the normal manner.

The steering device, while shown applied to the cultivation of row crops with a tractor, may be adapted to other purposes including plowing by guiding off of a furrow wall previously plowed, guiding from the standing crop at the edge of a previously-cut swath and guiding off a windrow; and, in addition, the invention is capable of being applied to vehicles generally in which it is desired to automatically steer from a predetermined physical contour by means of one or more feelers.

We claim:

1. In a tractor having steerable wheels and power steering means for steering the tractor; feeler means mounted on the front of the tractor for contacting a physical line to be followed, said feeler means being supported in a manner permitting lateral displacement in either direction from a central neutral position due to contact with the physical line, control means actuated by lateral displacement of the feeler means for operating the power steering means to steer the tractor in a direction to realign the feeler means with the line, the control means being movable relative to the feeler means to vary its central neutral position, and follow-up means actuated upon operation of the power steering means for displacing the control means towards neutral position of the feeler means to prevent oversteering by the power steering means.

2. In a tractor having steerable wheels and power steering means for steering the tractor; feeler means mounted on the front of the tractor for contacting a physical line to be followed, said feeler means being supported in a manner permitting lateral displacement in either direction from a central neutral position due to contact with the physical line, control means including at least one electrical switch actuated by lateral displacement of the feeler means for operating the power steering means to steer the tractor in a direction to realign the feeler means with the line, the control means being movable relative to the feeler means to vary its central neutral position, and follow-up means actuated upon operation of the power steering means for displacing the switch towards neutral position of the feeler means to prevent oversteering by the power steering means.

3. In a tractor having steerable wheels and power steering means for steering the tractor; feeler means mounted on the front of the tractor for contacting a physical line to be followed, said feeler means being supported in a manner permitting lateral displacement in either direction from a central neutral position due to contact with the physical line, control means including a pair of electrical switches selectively actuated by lateral displacement of the feeler means in either direction for operating the power steering means to steer the tractor in a direction to realign the feeler means with the line, the control means being movable relative to the feeler means to vary its central neutral position, and follow-up means actuated upon operation of the power steering means for displacing the electrical switches towards neutral position of the feeler means to prevent oversteering by the power steering means.

4. In an automatic steering vehicle; steerable front wheels, power steering means for steering said front wheels, a drag link connected with the power steering means for controlling its operation, means including a steering gear and pitman arm for moving the drag link from a steering position on the tractor, the drag link having means, including a longitudinally-extending screw and cooperating threaded sleeve, interposed between its ends, a reversible electric motor for producing relative rotation between the screw and sleeve for controlling operation of the power steering means, feeler means carried at the front of the vehicle and laterally movable for following a surface, and means, including a pair of electric switches selectively actuated by lateral movement of the feeler means for controlling operation of the electric motor to effect corrective steering of the vehicle to cause the feeler means to follow the surface.

5. In an automatic steering vehicle; steerable front wheels, power steering means for steering said front wheels, a drag link connected with the power steering means for controlling its operation, means including a steering gear and pitman arm for moving the drag link from a steering position on the tractor, the drag link having means, including a longitudinally-extending screw and cooperating threaded sleeve, interposed between its ends, a reversible electric motor for producing relative rotation between the screw and sleeve for controlling operation of the power steering means, laterally movable feeler means carried at the front of the vehicle for following a line, and means actuated responsive to lateral movement of the feeler means for operating the electric motor to effect corrective steering of the vehicle to cause the feeler means to follow the line.

6. In an automatic steering vehicle; steerable front wheels, power steering means connected with the front wheels for steering said front wheels, a drag link connected with the power steering means for controlling its operation, means including a steering gear and a pitman arm connected to the drag link for moving the drag link from a steering position on the tractor, the drag link having means, including a longitudinally-extending screw and cooperating threaded sleeve, interposed between its ends, and a reversible electric motor for producing relative rotation between the screw and sleeve for controlling operation of the power steering means.

7. An automatic steering tractor having steerable front wheels, power steering means connected with the front wheels for steering said front wheels, an implement mounted on said tractor and having elements movable between raised transport position and lowered operating position, laterally displaceable feeler means mounted on the forward end of the tractor and having a lower portion adapted to contact a crop adjacent ground level, the feeler means being movable between lowered operating position and raised position, means responsive to lateral displacement of the feeler means in either direction for controlling the power steering means to institute corrective steering of the tractor and maintain the feeler means adjacent the crop, and means responsive to raising of the elements to transport position for raising the feeler means away from ground level.

8. An automatic steering tractor having steerable front wheels, power steering means connected with the front wheels for steering said front wheels, a cultivator mounted on said tractor and having sweeps movable between raised transport position and lowered operating position, laterally displaceable feeler means mounted on the forward end of the tractor and having a horizontal, rearwardly-extending, lower terminal portion adapted to contact a crop adjacent ground level, the feeler means being movable between lowered operating position and raised position, means responsive to lateral displacement of the feeler means in either direction for controlling the power steering means to institute corrective steering of the tractor and maintain the feeler means adjacent the crop, and means responsive to raising of the cultivator sweeps to transport position for raising the feeler means away from ground level.

9. An automatic steering tractor having steerable front wheels, power steering means connected with the front wheels for steering said front wheels, a cultivator mounted on said tractor and having sweeps movable between raised transport position and lowered operating position, a pair of laterally displaceable feelers mounted on the forward end of the tractor and having generally-parallel, horizontal, rearwardly-extending, lower portions adapted to contact a crop row adjacent ground level, the feelers being movable between lowered operating position and raised position, means responsive to lateral displacement of the feelers in either direction for controlling the power steering means to institute corrective steering of the tractor and maintain the feelers centered on the crop row, and means responsive to raising of the cultivator sweeps to transport position for raising the feelers away from ground level.

10. In a tractor having steerable wheels and power steering means for steering the tractor; a pair of feelers for contacting each side of a crop row adjacent the front of the tractor, means pivotally mounting the feelers on a longitudinally extending, generally horizontal axis at the front of the tractor, the feelers projecting downwardly from said axis and the lower ends of the feelers being laterally displaceable by rotation of the feelers about said axis, and means responsive to rotation of the feelers about said axis for controlling the power steering means; the feelers having a central neutral position in which the power steering means is not actuated and rotation of the feelers in either direction from the neutral position actuating the power steering means to steer the tractor in a direction to recenter the feelers on the crop row and to restore the feelers to neutral position.

11. In a tractor having steerable wheels and power steering means for steering the tractor; a pair of feelers for contacting a crop row adjacent the front of the tractor, means including a longitudinally-extending, generally horizontal shaft rotatably supported from the tractor for limited axial rotation, the feelers being fixed to and projecting downwardly from said shaft and lateral displacement of the feelers in either direction rotating said shaft, and means responsive to rotation of said shaft for controlling the power steering means; the shaft having a central neutral position in which the power steering means is not actuated, and rotation of the shaft in either direction beyond the central neutral position by lateral displacement of the feelers causing actuation of the power steering means to steer the tractor in a direction to recenter the feelers on the crop row and thereby restore the shaft to neutral position.

12. In a tractor having steerable wheels and power steering means for steering the tractor, a pair of feelers for contacting a crop row adjacent the front of the tractor, means including a longitudinally-extending, generally horizontal shaft rotatably supported from the tractor for limited axial rotation, the feelers being fixed to and projecting downwardly from said shaft and lateral displacement of the feelers in either direction rotating said shaft, and electrical switch means responsive to rotation of said shaft for controlling the said power steering means, the shaft having a central neutral position in which the power steering means is not actuated, and rotation of the shaft in either direction beyond the central neutral position by lateral displacement of the feelers actuating the switch means to cause operation of the power steering means and steer the tractor in a direction to restore the feelers on the crop row and restore the shaft to neutral position.

13. In a tractor having steerable wheels and power steering means for steering the tractor, a pair of feelers for contacting a crop row adjacent the front of the tractor, means including a longitudinally-extending, generally horizontal shaft rotatably supported from the tractor for limited axial rotation, the feelers being fixed to and projecting downwardly from said shaft and the lateral displacement of the feelers in either direction rotating said shaft, and means responsive to rotation of said shaft for controlling the said power steering means, including a pair of electrical switches selectively actuated, the shaft having a central neutral position in which neither switch is actuated and rotation of the shaft in either direction beyond the central neutral position by lateral displacement of the feelers actuates one of the switches to cause operation of the power steering means and steer the tractor in a direction to restore the feelers on the crop row and restore the shaft to neutral position.

14. In combination with a tractor having steerable front wheels and a steering system, including power steering means, for steering said wheels; feeler means mounted on the front of the tractor for sensing the position of a physical line to be followed, said feeler means being supported in a manner permitting lateral displacement thereof, a steering gear and pitman arm, a telescoping drag link connecting the power steering means and the pitman arm and including a longitudinally extending screw and cooperating threaded sleeve, movement of the forward end of the drag link controlling operation of the power steering means, and power means responsive to lateral displacement of the feeler means for relatively rotating the screw and sleeve to alter the length of the drag link and actuate the power steering means to effect corrective steering of the tractor.

References Cited in the file of this patent

UNITED STATES PATENTS

| | | |
|---|---|---|
| Re. 23,867 | Garrison | Sept. 14, 1954 |
| 1,868,360 | Knight | July 19, 1932 |
| 2,496,727 | Jenkins | Feb. 7, 1950 |
| 2,509,914 | Goodwine | May 30, 1950 |

FOREIGN PATENTS

| | | |
|---|---|---|
| 448,917 | Canada | June 1, 1948 |